US007275098B1

United States Patent
Becher et al.

(10) Patent No.: US 7,275,098 B1
(45) Date of Patent: Sep. 25, 2007

(54) METHODS AND APPARATUS FOR ADMINISTERING SOFTWARE MODULES IN A STORAGE AREA NETWORK MANAGEMENT APPLICATION

(75) Inventors: Andrew S. Becher, North Attleboro, MA (US); Stanislav Sosnovsky, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 829 days.

(21) Appl. No.: 10/608,608

(22) Filed: Jun. 27, 2003

(51) Int. Cl.
*G06F 15/173* (2006.01)
*G06F 9/445* (2006.01)
(52) U.S. Cl. .................. 709/223; 717/174; 717/176
(58) Field of Classification Search ................ 717/176
See application file for complete search history.

(56) References Cited

U.S. PATENT DOCUMENTS

| 6,539,422 B1 * | 3/2003 | Hunt et al. ................ 709/217 |
| 6,857,013 B2 * | 2/2005 | Ramberg et al. ............ 709/223 |
| 2003/0177170 A1 * | 9/2003 | Glass ........................ 709/203 |

\* cited by examiner

Primary Examiner—Tuan Dam
Assistant Examiner—Isaac Tecklu
(74) Attorney, Agent, or Firm—Chapin IP Law, LLC; Barry W. Chapin, Esq.

(57) ABSTRACT

System, methods and apparatus operate a module server to service a plurality of different storage area network management modules that each provides a respective type of management functionality for elements operating within a storage area network. The system operates an administration module in conjunction with a module sever. The administration module provides a plurality of module administration interfaces that are software interfaces that can be remotely invoked to administer the plurality of different storage area network management modules. The system receives a remote invocation of at least one of the plurality of module administration interfaces and applies module administration functionality associated with the at least one remotely invoked module administration interface to remotely administer at least one of the storage area network management modules serviced by the module server. By decoupling the administration from the module server, the module server does not need to be shut down to perform module administration and is a less complicated and smaller software process.

28 Claims, 11 Drawing Sheets

DEPLOY MODULE INTERFACE

REMOVE / UNDEPLOY / UNINSTALL MODULE INTERFACE

DEACTIVATE MODULE INTERFACE

DISABLE MODULE INTERFACE

202
RECEIVE A REMOTE INVOCATION OF AT LEAST ONE OF THE PLURALITY OF MODULE ADMINISTRATION INTERFACES TO REMOTELY ADMINISTER AT LEAST ONE OF THE STORAGE AREA NETWORK MANAGEMENT MODULES SERVICED BY THE MODULE SERVER

250
RECEIVE AT LEAST ONE DESCRIPTION INTERFACE CALL TO THE AT LEAST ONE DESCRIPTION INTERFACE, THE AT LEAST ONE DESCRIPTION INTERFACE CALL REQUESTING REMOTE ACCESS TO DESCRIPTIVE INFORMATION RELATED TO AT LEAST ONE OF THE INSTALLED STORAGE AREA NETWORK MANAGEMENT MODULES OPERATING IN CONJUNCTION WITH THE MODULE SERVER IN THE STORAGE AREA NETWORK MANAGEMENT APPLICATION IN THE COMPUTERIZED DEVICE

251
DESCRIPTION INTERFACE CALL IS A MODULE METADATA LIST CALL REQUESTING ACCESS TO MODULE METADATA FOR AT LEAST ONE INSTALLED MODULE THAT OPERATES IN CONJUNCTION WITH THE MODULE SERVER

252
DESCRIPTION INTERFACE CALL IS A DESCRIBE MODULE CALL REQUESTING A MODULE DESCRIPTOR ASSOCIATED WITH A MODULE THAT IS INSTALLED TO OPERATE WITH THE MODULE SERVER AND THAT IS IDENTIFIED BY A MODULE IDENTIFICATION SPECIFIED IN THE DESCRIBE MODULE CALL

253
DESCRIPTION INTERFACE CALL IS A INTEROPERABLE OBJECT REFERENCE CALL REQUESTING ACCESS TO AT LEAST ONE INTEROPERABLE OBJECT REFERENCE ASSOCIATED WITH AT LEAST ONE MODULE THAT IS INSTALLED TO OPERATE WITH THE MODULE SERVER AND THAT IS IDENTIFIED BY A MODULE IDENTIFICATION SPECIFIED IN THE INTEROPERABLE OBJECT REFERENCE CALL

TO STEP 203 IN FIG. 8B

DESCRIPTION INTERFACES (MODULE METADATA LIST, DESCRIBE MODULE AND INTEROPERABLE OBJECT REFERNECE INTERFACE)

FIG. 8A

MODULE CONTAINER STATE INTERFACE

MODULE SERVICE HOME IDENTIFICATION INTERFACE

METHODS AND APPARATUS FOR ADMINISTERING SOFTWARE MODULES IN A STORAGE AREA NETWORK MANAGEMENT APPLICATION

BACKGROUND

Modern conventional distributed computer software applications frequently operate in networked computing environments that include several different types of computerized devices that are each responsible for executing different portions of the distributed software application. The different portions of the distributed software application communicate with each other over a network to exchange information related to the functionality of the software application. By way of example, consider a storage area network environment in which several storage area network elements (i.e., devices) such as disk storage systems, tape backup systems, network attached storage devices, server or host computer systems, storage area network switches and other such elements interoperate to provide overall storage area network functionality. A developer or administrator of such a storage area network environment may install one or more distributed storage area network management software applications within the storage area network to manage or administer the various elements (i.e., devices, computer systems, storage systems, etc.) that operate within the storage area network.

A typical conventional storage area network management software application may have several different portions. There typically exists a console portion that executes or otherwise operates in a dedicated storage area network management workstation to allow the administrator to remotely control and manage all of the various elements within the storage area network from this central location. The console is typically a graphical user interface-based application that allows the administrator to graphically visualize the storage area network for selection of individual elements to monitor and/or manage. Host computer systems such as data servers within the storage area network may operate agent or responder portions of the storage area network management application that receive remote management commands from the console and apply functionality associated with these commands to the elements within the storage area network (e.g., to data storage systems coupled to the host). There may be several of these remote agent or responder portions of the storage area network management application distributed throughout the storage area network, and some may operate in server computer systems, while others may operate directly within other storage area network elements such as switches, data storage systems, and the like.

To assist in the development of such complex distributed or networked software applications, software application developers working within several commercial companies and software development consortiums have created a number of different software development architectures, platforms or paradigms to allow for the efficient creation of distributed or highly complex software applications. As an example, software development platforms such as the "Java 2 Enterprise Edition" (J2EE) developed and distributed by Sun Microsystems, Inc. of Palo Alto Calif. and the "Common Object Request Broker Architecture" (CORBA) software development model created by a consortium of software developers at different companies each provide object oriented and/or component-based software development platforms and software application runtime environment architectures that allow for efficient creation, integration and reuse of software objects or components.

Using CORBA as an example, a software application developer can create conventional CORBA-based software components that encapsulate functionality related to a specific task or operation. The software components can operate on a remote computer system in conjunction with the component server. The developers of the CORBA system have created a conventional CORBA-based C++ component framework that implements a lightweight component model that is based on a CORBA portable object adapter specification. In the CORBA component framework, a CORBA component server includes tightly integrated component management functionality to allow a remotely executing management software application to cause the CORBA component server to load, link and activate various developer-created software components that require access to the CORBA component server. The CORBA component framework thus supports service components to provide remote services as per software developer's requirements and further allows the software developer to control or remotely manage the component server to control installation and activation of those component services. As an example, if conventional a CORBA-based system were used to create a distributed software application, the developer would install the component server on the remote computer system and could interact directly with the component server to use management functionality integrated into the component server to remote install various software components to perform functionality created by the developer. The component server includes component management or administration functionality to allow the developer, for example, to remotely start and stop execution of developer-created components, and to remote load and unload such components.

SUMMARY

Conventional techniques for development and remote management of object-oriented and/or component based software applications suffer from a variety of deficiencies. In particular, management of software components or objects operating within the J2EE or CORBA software development and execution environments is substantially cumbersome and involves an interruptive process to perform many remote component or object administration functions.

As an example, when a software developer creates a number of software components using the conventional CORBA component framework, the conventional component server includes a tightly integrated component administration portion that provides a means for component deployment, upgrade and other administration functions such as starting and stopping certain components. Developers sometimes refer to the administration portion of the component server as an "administration component", but unlike developer-created software components, the conventional administration component is supplied with the component server and is actually tightly coupled to the component server functionality. That is, the conventional administration component shipped with the CORBA component framework is not truly a component itself since, for example, replacement of the administration component requires replacement of the component server as well. Thus, the conventional CORBA component server is generally considered by developers to have management functionality built-in in a tightly integrated manner.

In addition, since the conventional component administration portion of the CORBA component server is tightly integrated into the component server itself, if an administrator or developer desires to create, install and deploy (i.e., operate) a new software component into an existing component environment in which a component server is already currently operating, the developer must temporarily shut down the conventional component server in order to reconfigure the component server to have knowledge of, and to be able to operate the new software component which is added into the configuration to produce a new configuration for the component server.

Further still, since the conventional component server has management functionality built-in to itself in the form of the highly integrated component administration portion, should management requirements of a software component associated with the conventional component server change, a developer or owner of the distributed software application must replace or upgrade the entire component server with a newer or modified version that contains upgraded management capabilities. As an example, if a current implementation of a conventional component server only supports certain management functionality with respect to component administration (i.e., deployment, installation and operational control of the various software components that operate in conjunction with the component server) and a developer creates a new software component that require additional management functionality not present in the current conventional component server, the conventional CORBA development and execution environment requires that the developer replace the current conventional component server with a new version of the conventional component server that is capable of taking advantage of the additional management functionality that the developer has implemented within the new software component that her or she created. Accordingly, when using conventional component-based software development and execution environments, management or administration of the various software components that interoperate in conjunction with a conventional component server is highly limited by the management functionality built-in to the component server itself.

Embodiments of the invention significantly overcome such deficiencies and provide mechanisms and techniques that allow administration of software modules that operate as part of a storage area network management software application that provides remote management capability of elements (e.g., devices such as servers, switches and data storage systems) in a storage area network. In particular, embodiments of the invention include an administration module that provides an application programming interface that includes several unique module administration (i.e., management) interfaces that allow a remotely executing storage area network management console software application to provide remote management of software modules, including the administration module itself, that operate in conjunction with a module server. The module administration interfaces and associated interface processing functionality of embodiments of this invention provide a unique set of management functions or services that allow remote deployment and installation as well as runtime control and operation of many different types of software modules to each interoperate with a module server. The software modules that operate in conjunction with the module server can, for example, provide storage area network element management functionality and serve a variety of different functions such as storage area network switch management, data storage system management, host or server management, storage area network zoning, element discovery and other such functions associated with management and control of elements (e.g., devices or program running on such devices) operating in a storage area network environment.

The administration module configured in accordance with embodiments of the invention is capable of receiving calls to the various module administration interfaces that the administration module provides in order to, for example, deploy and install a new software module in order to provide additional control of storage area network elements. As another example, the module administration interfaces configured in accordance with embodiments of the invention support operations such as activation and deactivation of installed software modules. In addition, the module administration interfaces provided as part of the administration module in accordance with embodiments of the invention provide a number of description interfaces that allow remote access to descriptive information related to the installed storage area network management modules. Such descriptive information can include, for example, an interoperable object reference (IOR) that serves as a globally unique identifier for the software module.

Since embodiments of the invention provide a distributed software development platform that decouples software module management tasks from a module server that services operation of the individual software modules, administration functions such as the addition or installation and deployment of a new software module do not disrupt operation of the module server with respect to other software modules currently installed and operating in conjunction with the module server. As an example, embodiments of the invention allow a software developer to create a new software module for deployment within a storage area network management application in order to manage a new type of storage area network element within the storage area network. The developer can then operate a storage area network management console to invoke module administration interfaces associated with the administration module of this invention in order to deploy and activate the new software module to operate with the module server, without disrupting or interfering with concurrent operation of already installed software modules that are currently interacting with the module server. This allows modules to be started and stopped and installed and de-installed without having to halt operation of the module server.

Generally then, embodiments of the invention provide an administration module within a storage area network management application that decouples administration or module management tasks from a module server and that implements or realizes the interface through which an administrator can deploy, upgrade, remove, configure and obtain descriptive information for other software modules that operate in conjunction with the module server. By providing an administration module that handles remote management and administration tasks of other modules, embodiments of the invention also allow a developer to more easily implement additional management functionality without having to replace the entire module server that is currently servicing pre-existing software modules used for management of storage area network elements. Instead, the developer can add the new management functionality into a new version of the administration module and can then operate module administration interfaces associated with the currently operating administration module in order to replace the currently installed administration module with a new version of the administration module containing the additional or new or modified management functionality. In this manner, embodiments of the invention allow the creation and addition of advanced management functionality without having to replace and reinstall the entire module server which would be a significant disruption to each of the other software modules currently installed for use to manage elements in a storage area network. Conventional systems that operate, for example, using a component server and that require new or modified component management functionality require that the entire component server be replaced. Thus, in comparing this aspect of the present invention with the conventional component server based architecture, the module server of this invention does not need to be replaced and currently operating modules can continue operation while new modules are added, removed, started and stopped, including the administration module itself.

More specifically, embodiments of the invention include systems, apparatus and methods for administering software modules that operate as part of a storage area network management software application. One such method embodiment comprises operating a module server to service a plurality of different storage area network management modules. Each storage area network management module provides a respective type of management functionality for elements such as hosts, switches and storage devices operating within a storage area network associated with the computerized device. According to embodiments of the invention, the module server lacks general administration capability of the plurality of different storage area network management modules. In other words, the module server configured according to embodiments of the invention does not include management or administration functionality such as the ability to install and deploy new software modules.

To provide the management functionality that does not need to exist in the module server, embodiments of the invention operate an administration module in conjunction with the module sever. The administration module provides a plurality of module administration interfaces that can be remotely invoked to administer the different storage area network management modules.

In particular, the module administration interfaces include at least one installation interface having associated module administration installation functionality allowing remote installation and removal of storage area network management modules operating in the storage area network management application in the computerized device. Other module administration interfaces include at least one activation control interface having associated module administration activation control functionality allowing remote control and operation of installed storage area network management modules operating in the storage area network management application in the computerized device. Such control can include activation of modules and controlling on-demand activation of a module to instruct the module as to whether or not it should automatically be started in the event of a request for service from the module and other such operational control functions. The set of module administration interfaces also include at least one description interface allowing remote access to descriptive information related to the installed storage area network management modules operating in conjunction with the module server in the storage area network management application in the computerized device.

Embodiments of the invention operate to receive a remote invocation of at least one of (e.g., a call to) the module administration interfaces to remotely administer at least one of the storage area network management modules serviced by the module server. A storage area network management console application operating within a storage area network management computer system coupled to the computerized device over a storage area network data communications medium can supply the remote invocations or calls to the module administration interfaces. Upon receipt of such a module administration interface call, embodiments of the invention apply module administration functionality associated with the remotely invoked module administration interface to remotely administer at least one of the storage area network management modules serviced by the module server.

By providing such module administration interfaces within an administration module itself, as opposed to within a component server as is done in conventional systems, the administration module configured in accordance with embodiments of the invention allows remote administration of software modules used within a storage area network management application while decoupling the administration and management functionality of the module server to allow for a lesser processing burden on the module server and thus less complex module server code. Embodiments of the invention also to allow for ease of addition of new management capability related to administration of software modules.

Other embodiments of the invention include a computerized device, such as a host computerized device, workstation or other computerized device configured with a storage area network management application that can process all of the aforementioned method operations disclosed herein as embodiments of the invention. In such embodiments, the computerized device includes a memory, a processor and an interconnection mechanism connecting the processor and the memory. The memory, that may be any type of computer readable medium, is encoded with a storage area network management application code that when performed on the processor, produces a storage area network management process that provides remote administration capability of modules that interoperate with a module server as explained herein. The computerized device configured in this manner performs all of the method embodiments and operations explained herein as embodiment of the invention.

Other arrangements of embodiments of the invention that are disclosed herein include software programs to perform the method embodiment steps and operations summarized above and disclosed in detail below. More particularly, a computer program product is disclosed that has a computer-readable medium including computer program logic encoded thereon that when performed in a computerized device provides storage area network management application that includes an administration module that performs, when executed, the operations as explained herein. The computer program logic, when executed on at least one processor with a computerized device, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of elements in a storage area network or one of more storage area network management servers can also be enabled to provide the system of the invention.

It is to be understood that the system of the invention can be embodied strictly as a software program, as software and hardware, or as hardware alone. Example embodiments of the invention may be implemented within EMC's Control Center software application that provides storage area network management functionality for storage area network elements and in computerized devices that operate the Control Center software. Control Center is manufactured by EMC Corporation of Hopkinton, Mass., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
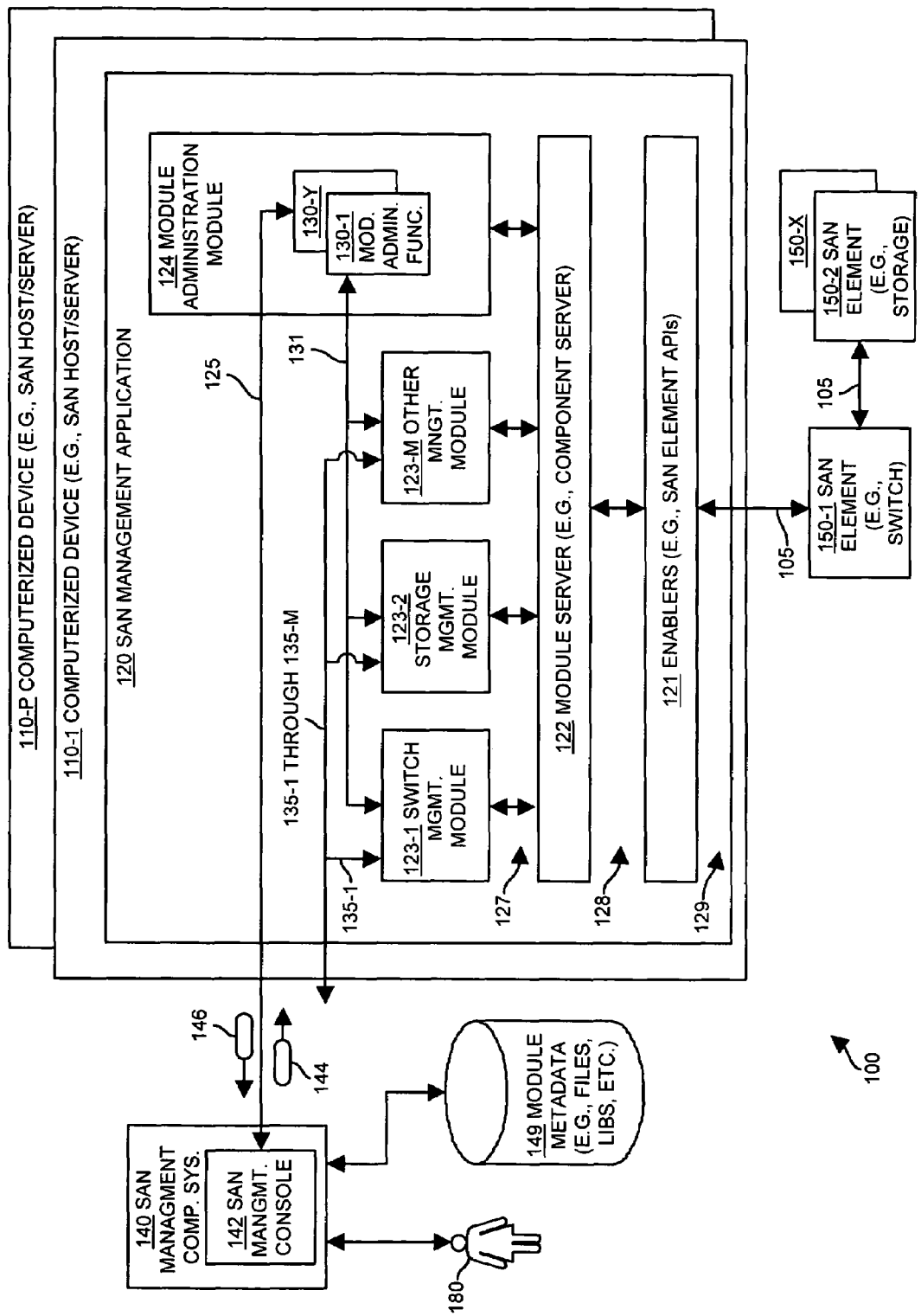
FIG. 1 illustrates a storage area network environment including a computerized device operating a storage area network management application according to one example embodiment of the invention.

FIG. 1 illustrates an example storage area network environment 100 suitable for use in explaining example embodiments of the invention. As illustrated, the storage area network environment 100 includes a plurality communications links 105 that form a network that couples a number of computerized devices 110-1 through 110-P, a storage area network management computer system 140, and a plurality of storage area network elements 150-1 through 150-X. The storage area network management computer system 140 operates (e.g., executes) a storage area network management console software application 142 that accesses module data 149 (to be explained). The computerized devices 110 represent storage area network host computer systems or servers, for example, and the storage area network elements 150 represent various devices that operate within a typical storage area network such as data communications switches, disk or tape data storage systems, network attached storage and other types of devices.

In this example, the computerized device 110-1 operates a storage area network management application 120 configured in accordance with embodiments of the invention. The storage area network management application 120 is a software application that operates in conjunction with the storage area network management console 142 (in the storage area network management computer system 140, over the network 105) in order to allow a storage area network administrator 180 to interact with the console 142 to manage the various storage area network elements 150 distributed throughout the storage area network environment 100. In one example embodiment, the storage area network management application 120 operates as an agent or other remotely controllable software program that is under the control of the storage area network management console 142.

The storage area network management application 120 includes a variety of software portions including a set of enablers 121, a module server 122, a plurality of storage area network management software modules 123-1 through 123-M, and an administration module 124. Generally, the enablers 121 represent storage area network element application programming interfaces (APIs) that the module server 122 uses to communicate with, and manage element functionality within, the manageable storage area network elements 150. The software modules 123 represent software portions or components of the storage area network management application 120 that can perform different management tasks associated with the overall management of the storage area network elements 150.

In particular, the illustrated example includes a switch management module 123-1 that represents a software module that provides storage area network switch management capability to manage the storage area network switch elements 150-1. This storage management module 123-2 represents a software module that contains (i.e., that can execute to provide) management functionality for data storage elements 150-2 within the storage area network environment 100. There may be other management modules 123-M that serve different storage area network management purposes as well. Examples of other modules 123-M include discovery modules to identify various devices operating within the storage area network 100, zoning modules to control access and privileges between the various devices within the environment 100 and third party or vendor-specific modules designed to provide management functionality associated with a third party of vendor specific storage area network element 150-X. Each module 123 provides a service interface 135-1 through 135-M that provides access to the respective storage area network element management functionality associated with that module 123-1 through 123-M. As an example, the service interface 135-1 for the switch management module 123-1 provides access to switch management functionality within the switch management module 123-1.

The administration module 124 is configured in accordance with embodiments of the invention to include a plurality of module administration functions 130-1 through 130-Y. Each module administration function 130 within the administration module 124 provides one or more module administration interfaces 125 that can be remotely activated, remotely invoked or otherwise called 144 by the remotely operating storage area network management console application 142 or other console applications (not specifically show) in order to apply 131 administration or management functionality to the software modules 123 that operate in conjunction with the module server 122. That is, embodiments of the invention provide the administration module 124 that exposes a number of module administration interfaces 125 that correspond to respective module administration functions 130 that the console 142 (under control of a user 180 or under control of another software process) can invoke 144 to remotely administer 131 the software modules 123 that operate in conjunction with the module server 122. Such remote administration functions 130 can provide module administration functionality 131 such as installation or deployment of new modules 123, removal of installed modules 123, activation and deactivation of the software modules 123, remote operational configuration and control of the modules 123, and collection of module description information associated with the modules 123 and the module server 122 for return to the management console 142. The administration module 124 can also remotely manage the module server 122 in some embodiments.

Figure 2:
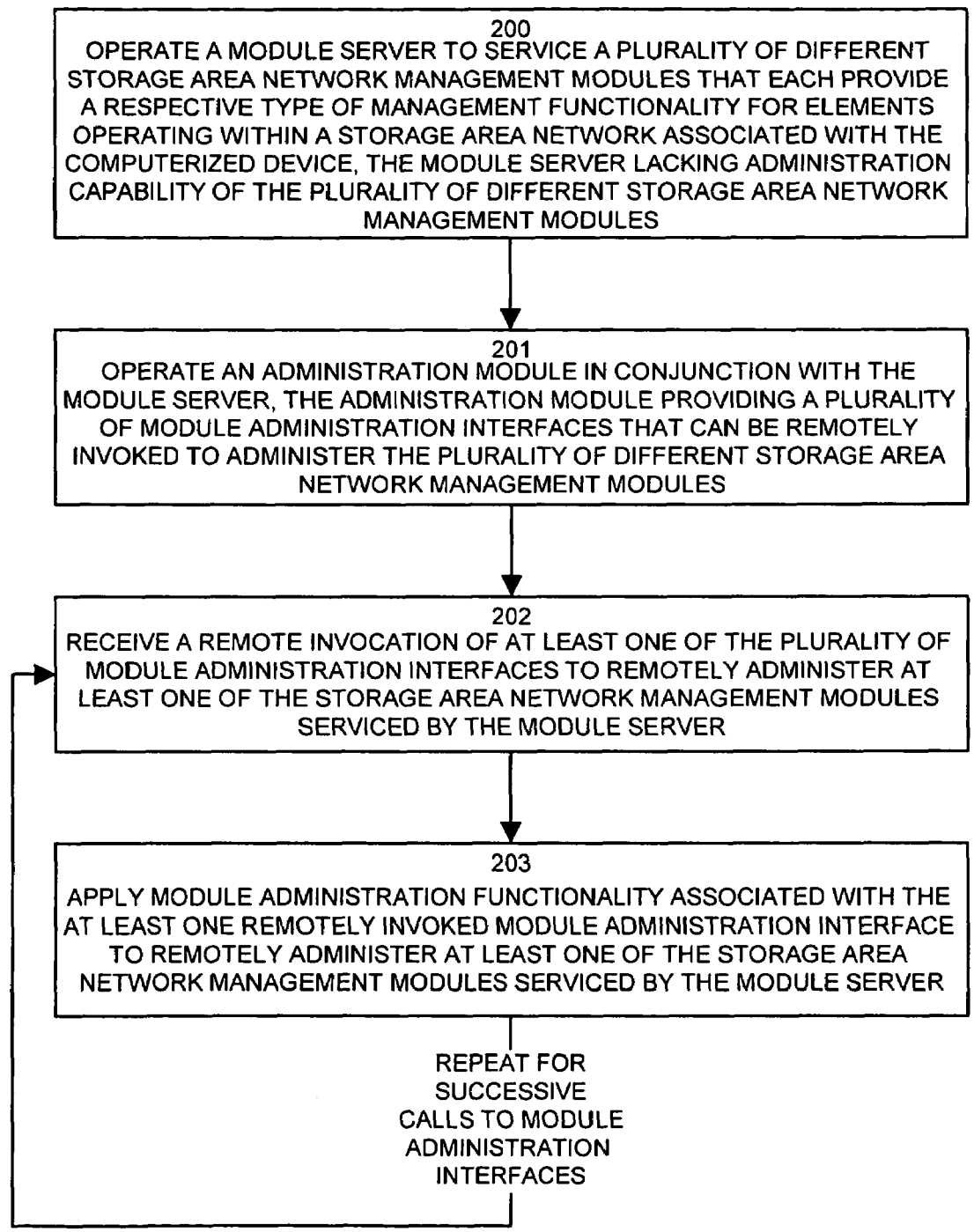
FIG. 2 is a flow chart of processing steps to perform remote administration of software modules that operate in conjunction with the module server that lacks administration or management functionality in accordance with one example embodiment of the invention.

Prior to this discussion of specific processing details regarding the various module administration functions 130 associated with the administration module 124, as well as specific module administration interfaces 125 and associated parameters, reference is now made to FIG. 2 for a discussion of the overall operation of a storage area network management application 120 configured with an administration module 124 in accordance with embodiments of the invention.

FIG. 2 is a flow chart of processing steps or operations that a storage area network management application 120 configured with an administration module 124 performs in accordance with embodiments of this invention in order to administer 131 the various software modules 123 that are responsible for management of storage area network elements 150.

In step 200, the storage area network management application 120 operates a module server 122 to service a plurality of different storage area network management modules 123 that each provide a respective type of management functionality for elements 150 operating within a storage area network 100 associated with the computerized device 110. According to embodiments of the invention, the module server 122 either does not require or lacks administration capability of the different storage area network management modules 123. That is, the module server 122 according to this invention does not require the ability to install, deploy, deinstall or un-deploy and/or return information regarding the various modules 123 used for management of elements 150 within the storage area network 100. In addition, the module server 122 does not include other administration functionality such as controlling general module operational functionality such as configuring how modules are to start and stop. The module server 122 is also not responsible for collecting data or module descriptor information (to be explained) associated with the modules 123 for return to the management console 142. It is noted that the module server 122 may include some or all of such management functionality, but embodiments of the invention do not rely on, require or use such module administration or management features of the module server 122. Rather, embodiments of the invention administer the modules 123 via management and administration functionality provided by the administration module 124 and its associated module administration functions 130 and module administration interfaces 125. Accordingly, the module server 122 used in embodiments of this invention can be devoid of module or component administration logic, thus making the module server 122 a more lightweight software process as opposed to conventional component servers that include tightly integrated or built-in component management functionality.

In step 201, the storage area network management application 120 operates the administration module 124 in conjunction with the module server 122. The administration module 124 is a module itself like the other modules 123 and interacts with the module server 122, but instead of providing element management functionality like the module 123, the administration module 124 provides a plurality of module administration interfaces 125 that can be remotely invoked (e.g., via the console 142) to administer the different storage area network management modules 123. That is, the administration module 124 provides module management functionality for the modules 123, and since it is a module itself, the module server 122 views the administration module 124 in a manner similar to that of any other module 123 with respect to its operation. One difference then between the software modules 123 that operate in conjunction with the module server 122 and the administration module 124 that also operates in conjunction with the module server 122 is that the modules 123 provide management functionality for storage area network elements 150 (e.g., devices in the storage area network environment 100) whereas the administration module 124 provides administration and management functionality for the other software modules 123, for the module server 122, and in some cases, for itself.

In step 202, the storage area network management application 120 receives a remote invocation 144 of at least one of the module administration interfaces 125 to remotely administer 131 or manage at least one of the storage area network management modules 123 serviced by the module server 122. As illustrated in the example in FIG. 1, the invocation 144 of a module administration interface 125 comes from the management console 142 under control of the storage area network administrator 180 (i.e., a person responsible for administering the storage area network 100). According to embodiments of the invention, there are many different types of interface calls, commands or invocations 144 to the different module administration interfaces 125 that the management console 142 can provide in order to cause the administration module 124 to remotely administer 131 the software modules 123 in different ways.

Generally, according to embodiments of the invention, the module administration interfaces 125 include different categories of classes of interfaces including:

i) installation interfaces ii) activation control interfaces; and iii) description interfaces.

The installation interfaces are a set of interface 125 that access associated module administration installation functionality 130 allowing remote installation and removal of storage area network management modules 123 operating in the storage area network management application 120 in the computerized device 110-1. As an example, the installation interfaces can include one or more deployment interfaces 125 for installation of new or modified modules 123, as well as one or more removal interfaces 125 that can de-install or remove a module 123 from the storage area network management application 120.

The activation control interfaces are a set of interfaces 125 that access associated module administration activation control functionality 130 allowing remote control and operation of installed storage area network management modules 123 when such modules 123 are operating in the storage area network management application 120 in the computerized device 110. The activation control interfaces generally control how a particular module 123 operates once it is installed and deployed for operation with a module server 122 in the storage area network management application 120. As an example, one activation control interface 125 called the "module on-demand activation" interface 125 provided by an administration module 124 in one example embodiment of the invention allows the administrator 180 to define if the module 123 is to start operation automatically with the module server 122 in the event the console 142 provides a management command to that module 123.

In addition, the module administration interfaces 125 can include one or more description interfaces 125 allowing remote access to descriptive information related to the installed storage area network management modules 123. As an example, one description interface 125 in one embodiment of the invention allows the management console 142 to receive information about installed modules 123, such as which modules 123 are currently installed for operation within the storage area network management application 120, as well as descriptors and identification of those particular modules 123.

In step 203, upon receiving a remote invocation 144 of a module administration interface 125, the storage area network management application 120 operates the administration module 124 to apply module administration functionality 130-1 through 130-Y associated with (i.e., corresponding to) the respective remotely invoked module administration interface 125-1 through 125-Y to remotely administer at least one of the storage area network management modules 123 serviced by the module server 122. In this manner, the administration module 124 can operate the appropriate module administration function(s) 130 for remote administration 131 of specific software modules 123. As will be explained, the calls 144 to the module administration interfaces 125-1 through 125-Y can identify which particular module 123 is to be administered remotely and can specify input and output parameters or information to be passed to and from the module 123 and may include parameters related to the operation of the module server 122 as well. Any return values 146 can be sent back from the administration module 124 to the calling entity, which is the console 142 in the example shown in FIG. 1.

Figure 3:
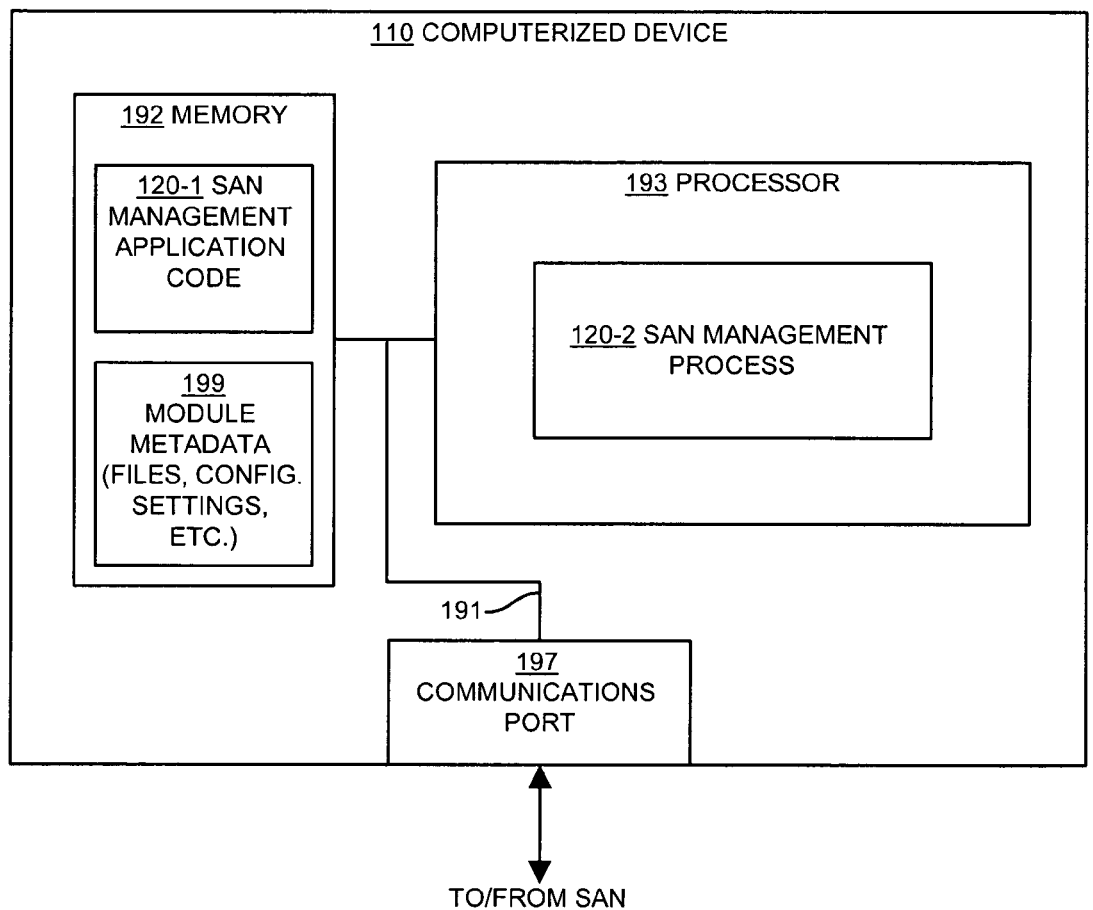
FIG. 3 illustrates a more detailed architecture of a computerized device including a storage area network management application that operates an administration module in accordance with one example embodiment of the invention.

FIG. 3 illustrates a more detailed architecture of one example computerized device 110 configured in accordance with embodiments of the invention. In this example, the computerized device 110 includes an interconnection mechanism 191 such as circuitry that couples a memory 192, a processor 193 and a data communications port 197 (e.g., a network interface). The processor 193 operates a storage area network management process 120-2 that in this example represents a runtime instantiation of the storage area network management application code 120-1. The storage area network management application 120 in FIG. 1 is collectively represented in FIG. 3 by the storage area network management process 120-2 and storage area network management application code 120-1.

The memory 192 is any type of computer readable medium such as semiconductor memory (volatile or non-volatile ransom access memory) or may be another type of storage media such as magnetic storage media (e.g., magnetic disk media that may be removable) or optical storage media. The memory 192 is encoded with data, logic instructions or other information that form the storage area network management application code 120-1. In other words, the storage area network management application code 120-1 in this example embodiment of the invention represents software code, data or logic instructions (e.g., object and/or source code) configured in memory that is capable of causing a computerized device 110 to carry out the operations and functionality of embodiments of the invention as explained herein and includes the functionality of the software modules 123, the administration module 124, the module server 122 and the enablers 121, as explained above with respect to FIG. 1.

The processor 193 represents any type of controller, microprocessor, central processing unit, circuitry, one or more microchips, boards, cards or other hardware that is capable of accessing the memory 192 over the interconnection mechanism 191. Doing so allows the processor 193 to execute, run, interpret, load or otherwise perform the storage area network management application code 120-1 in order to produce, instantiate or otherwise cause the creation of the storage area network management process 120-2. In other words, the storage area network management process 120-2 represents a run-time instantiation of the storage area network management application code 120-1. It is to be understood that in this example embodiment, the storage area network management application code 120-1 and the storage area network management process 120-2 represent embodiments of the processing within the storage area network management application 120 in the computerized device 110-1 as illustrated in FIG. 1.

FIGS. 4 through 10 provide flow charts of processing operations of various module administration interfaces 125-1 through 125-Y that each have associated module administration functions 130-1 through 130-Y. As discussed above, the administration module 124 within the storage area network management application 120 configured according to embodiments of the invention exposes the interfaces 125 for use by remote software programs, such as the console 142, in order to allow remote management and administration 131 of the software modules 123, 124 as well as the module server 122. Generally, the storage area network management application process 120-2 (abbreviated for the description as "the management process 120-2") including the administration module 124 performs steps in the flow charts in FIGS. 4 through 10. The processing operations shown in the flow charts in FIGS. 4 through 10 provide details of processing associated with steps 202 and 203 from the flow chart in FIG. 2.

As discussed above, in step 202 the storage area network management application 120 receives a remote invocation of one of the module administration interfaces 125. Then, in step 203, the same management application 120 applies corresponding module administration functionality 130 associated with the interface call to step 202 in order to carry out remote administration 131 of the modules 123 operating in conjunction with the module server 122. Accordingly, the flow charts in FIGS. 4 through 10 discuss the processing details associated with receiving the remote invocation 144 of each particular administration interface 125 and applying 131 corresponding module administration functionality 130 for those respective interfaces 125.

Figure 4:
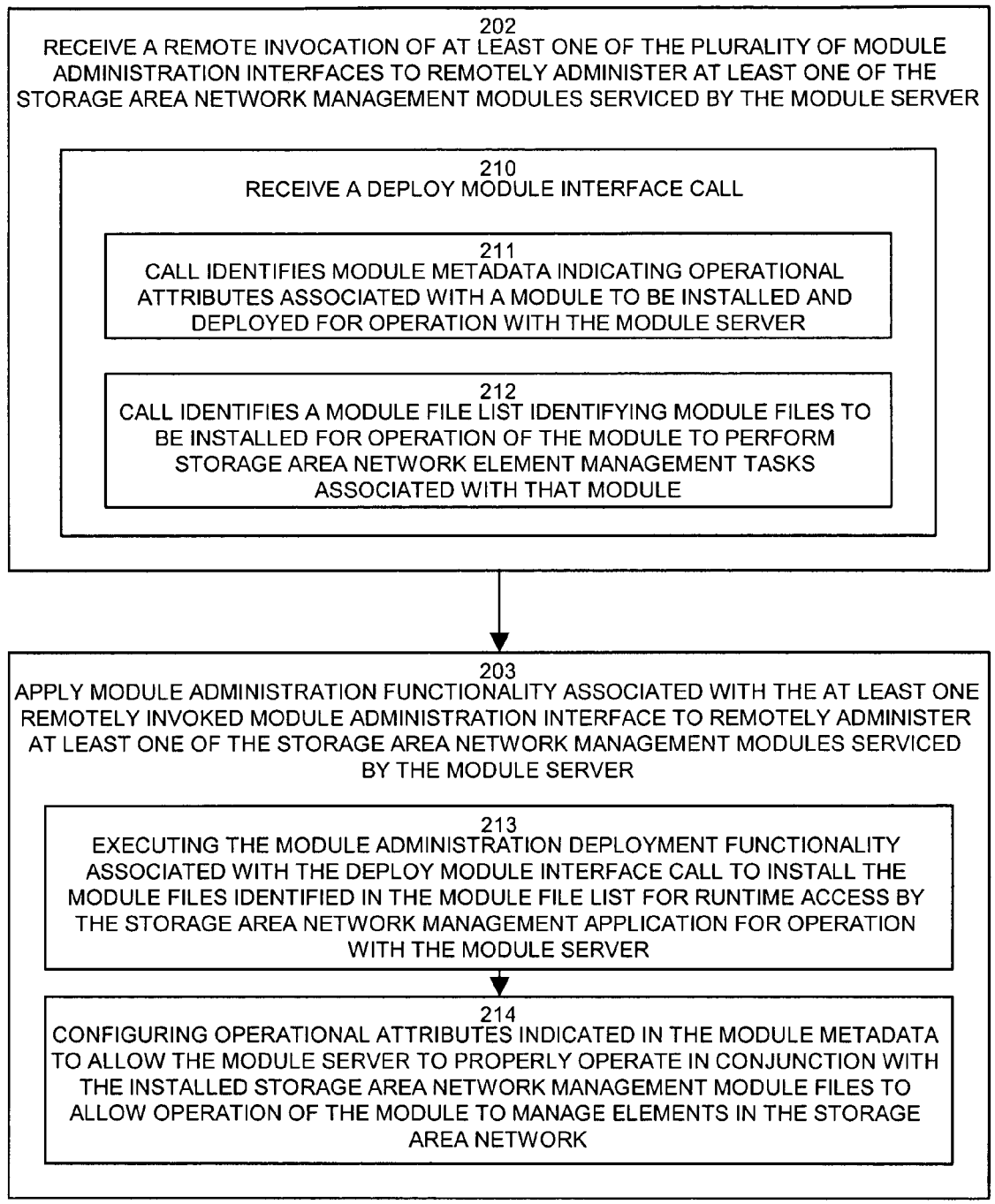
FIG. 4 illustrates processing steps performed by a storage area network management application to process a deploy module interface call in accordance with example embodiment of the invention.

FIG. 4 is a flow chart of processing operations that the management process 122 performs according to one embodiment of the invention to operate a deployment interface 125 in order to deploy a module 123 and associated module metadata for operation with the module server 122 and the storage area network management application 120.

In step 202, the management process 122 receives the remote invocation 144 of at least one of the module administration interfaces 125. In this example embodiment in FIG. 4, a shown and step 210, the management process 120-2 receives a deploy module interface call 144 to a module deployment interface 125.

As shown in step 211 in FIG. 4, receipt of the deploy module interface call 144 identifies module metadata 149 indicating operational attributes (e.g., values for parameters) associated with a module 123 to be installed and deployed for operation with the module server 122. The module metadata 149 identifies information associated with the module 123 to be deployed such as a module identification and a reference such as a pointer to a descriptor module data structure. The descriptor data structure passed in the deploy module interface call 144 can include data and information such as a textual description string of the functionality of the module 123 being deployed, as well as settings of various operational parameters such as whether or not the module 123 being deployed should be publicly accessible by remote software components and whether or not the module 123 should be explicitly activated upon startup of the module server 122. In addition, the module metadata 149 can include a binding name that the module server 122 publishes for access by remote software applications such as the console 142. Generally then, module metadata 149 identifies attributes and characteristics of the module 123 to be deployed such as its name, certain operational attributes and whether or not the module should be automatically started upon operation of the module server 122.

In addition, as indicated in step 212, the call 144 to the deploy module interface 125 includes a module file list identifying module files (from the module metadata store 149) to be installed for operation of the module 123 in order to perform storage area network element management tasks associated with that module 123. That is, the deploy module interface call 144 includes a reference to a list of module files stored in the metadata store 149 that contain the processing functionality associated with the module 123 to be installed for operation with the module server 122 within the same management application 120.

An pseudocode example of the deploy module interface call 144 to the deploy module interface 125 appears as follows:

Deploy_Module(Module_Metadata, Module_File_List)

Where Module_Metadata is a parameter pointing to a module metadata data structure containing the operational attributes discussed above and where Module_File_List is a pointer to the list of files to be installed for operation with the module server 122 that provide the functionality of the particular module 123 being installed. Note that the call to the deploy module interface 125 can cause the administration module 124 to raise an exception if the module being requested to be installed is already installed for operation with the module server 122.

In step 203, the management process 120-2 applies module administration functionality 130 associated with remotely invoked module administration interface 125, that in this case is the deployed module interface.

Specifically, in step 213, applying the module administration functionality (i.e., step 203) includes executing the module administration deployment functionality 130 associated with the deploy module interface call 125 to install 131 the module files 149 identified in the module file list parameter for runtime access by the storage area network management application 120 for operation with the module server 122. In other words, in step 213, the module administration functionality 130 corresponding to the deployed module interface call 144 to the deploy module interface 125 invokes the functionality to deploy or installed the particular module 123 reference to within the deploy module interface call 144. This processing includes obtaining each file from the metadata storage area 149 by references to each file specified in the Module_File_List parameter and installing those files for operation as a new module 123 with the module server 122.

In step 214, deployment of the module 123 also includes configuring operational attributes indicated in the module metadata to allow the module server 122 to properly operate in conjunction with the other installed storage area network management module files 123 and to allow proper operation of the module 123 to manage elements 150 in the storage area network 100. That is, in step 214, the deploy module functionality 130 obtains the various attributes from the Module_Metadata parameter and configures the module server 122 and the newly installed module 123 with the correct settings for each operational attribute. As indicated above, the operational attributes indicated by the module metadata in one embodiment of the invention can include an "activate on demand attribute" that is set to indicate whether that storage area network management module 123 (the one being installed) is to be activated for operation with the module server 122 on demand when a request for that module 123 is received by the storage area network management application 120. Such attributes can also identify, for example, whether or not this newly installed module 123 is to be automatically activated immediately upon installation or upon startup of the module server 122 (if the module server 122 is ever shut down for some reason) such that the module 123 is always active and does not need to wait for a call to a service interface 135. In addition, the module server attributes specified within the module metadata 149 can indicate whether or not certain interfaces or an interoperable object reference (IOR) associated with that module 123 are public within the module 123 such that remote applications can access such interfaces or the module itself. The administration module 124 can use a protocol such as the file transfer protocol to obtain the module files from the metadata store 149. The module metadata 149 is shown as being couple to the storage area network management console computer system 140 in the example in FIG. 1. It is to be understood that this database containing module files and parameter settings (i.e., module metadata) for each module 123 may be located anywhere within the storage area network 100.

Figure 5:
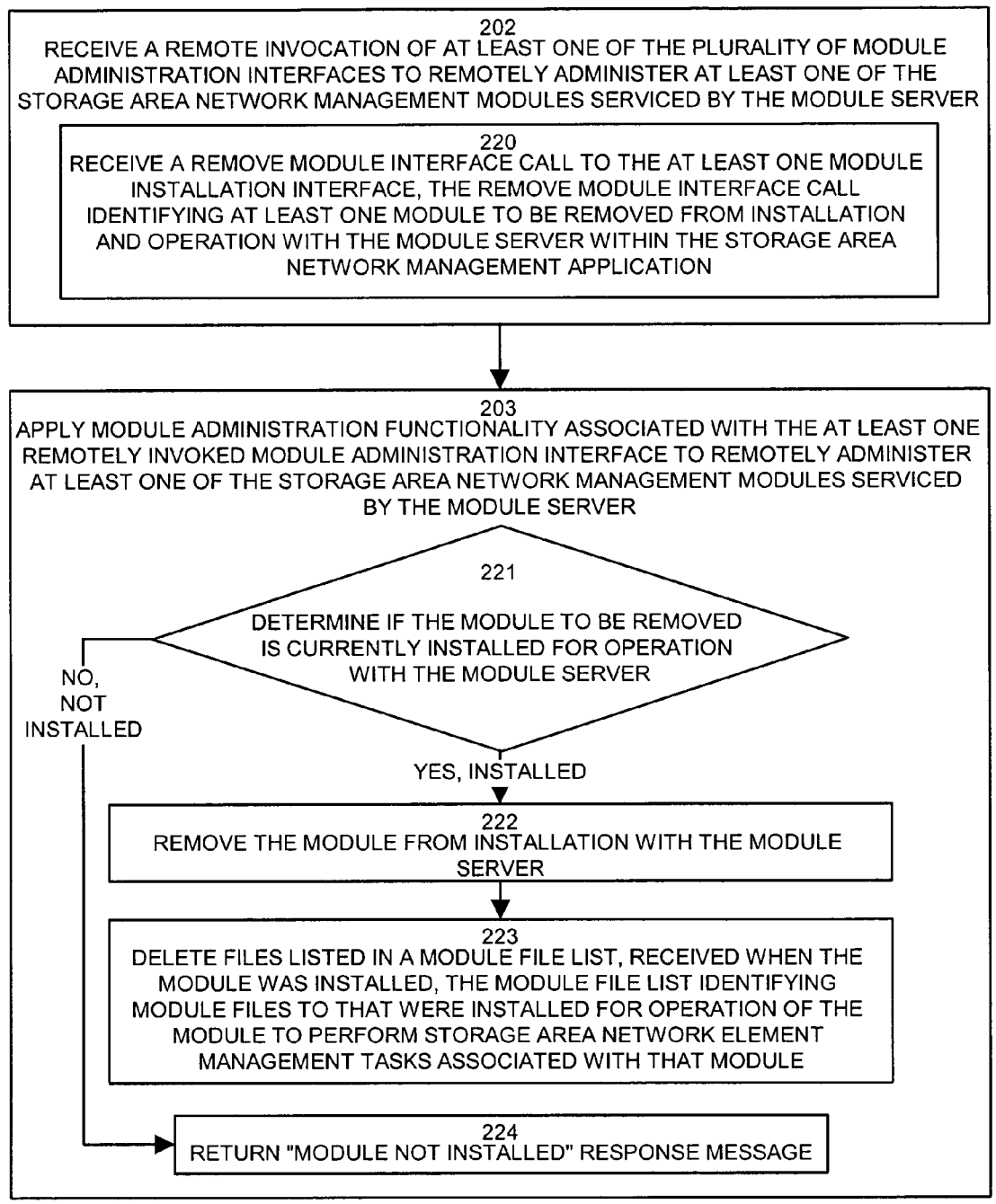
FIG. 5 illustrates processing steps performed by a storage area network management application to process a remove module interface call in accordance with example embodiment of the invention.

FIG. 5 is a flow chart of processing steps that show details of processing performed by the management process 120-2 to process an interface call 144 to a remove module interface 125 in order to de-install or un-deploy a particular module 123 so that the module 123 is no longer functionally operational with the module server 122.

In step 202, the management process 120-2 receives a remote invocation 144 of one of the module administration interfaces 125 that for this example is a remove module interface 125.

Specifically, in step 220, the administration and module 124 operating within the management process 120-2 receives a remove module interface call 144 to one of the module installation interfaces 125 which handles removal of modules. The remove module interface call 144 identifies at least one module 123 to be removed from installation and operation with the module server 122 within the storage area network management application 120. An example of a call to a remove module interface 125 in pseudocode appears as follows:

Remove_Module(Module_Identification);

where Module_Identification is a parameter that specifies the identification of a module 123 currently installed/deployed within the module server 122.

Next, in step 203, the management process 120-2 applies module administration functionality associated with the remotely invoked module administration interface (i.e., the remove module interface).

To do so, in step 221, the management process 120-2 determines if the module 123 to be removed is currently installed for operation with the module server 122, and if so, in step 222 the administration module 124 removes 131 the identified module 123 from installation with the module server and in step 223 deletes files listed in the module file list that was received when the module 123 now being deleted was formerly installed. As discussed above, the module file list identifies module files to that were installed for operation of the module 123 with the module server 122 to perform storage area network element management tasks associated with that module 123. In one embodiment, those files are deleted on removal of the module 123. Alternatively, the module files themselves may remain in storage accessible to the computerized device 110, but the administration module 124 removes reference to those files as a working module within the module server 122.

In step 221, if the management process 120-1 determines that the module 123 to be removed is not presently installed for operation with the module server 122, then the call 144 to the removed module interface 125 returns 146 a "module not installed" indication or error message to the calling application such as the console 142.

In this manner, the processing in FIG. 5 provides an interface to allow applications such as the console 142 to remove or uninstall individual modules 123 by calling the remove module interface 125 provided by the administration and module 124.

Figure 6:
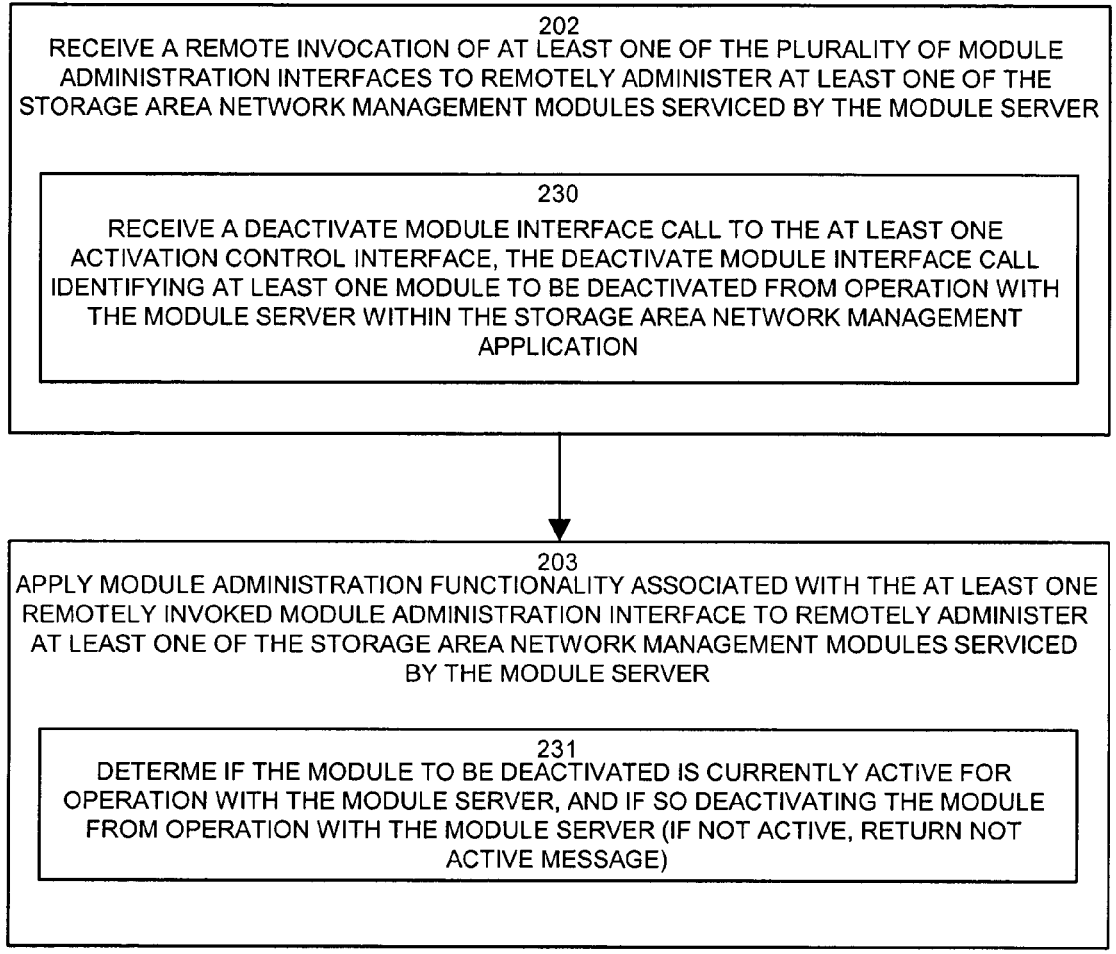
FIG. 6 illustrates processing steps performed by a storage area network management application to process a deactivate module interface call in accordance with example embodiment of the invention.

FIG. 6 is a flow chart of processing steps that show processing operations of the administration module 124 that provide a deactivation module interface 125 that is capable of deactivating a particular module 123 when provided its module identification.

In step 202, the management process 120-2 receives a remote invocation of at least one of the plurality of module administration interfaces. As shown in step 230, this processing in this embodiment includes receiving a "deactivate module" interface call 144 to the at least one activation control interface 125. The deactivate module interface call 144 identifies at least one module 123 to be deactivated from operation with the module server 122 within the storage area network management application 120. A pseudocode example of the deactivate module interface call appears as follows:

Deactivate_Module (Module_Identification);

where the parameter Module_Identification provides an identification of the particular module 123 that is to be deactivated from operation with the module server 122. An administrator 180 operating the console 142 can utilize or provide the deactivate module interface call 144 in order to stop operation of a particular module 123 prior to its de-installation or removal from operation with the module server 122. The purpose of deactivating a module 123 might be, for example, to cause the module 123 to cease operation with remote clients that might be using the module to perform element management within the storage area network. In this manner, the deactivate module interface call can turn off module operation gracefully prior to removal of the module without abruptly terminating any client applications that might be interacting or otherwise relying upon the module 123 at that time.

Next, in step 203 the management process 120-2 applies module administration functionality 130 associated with the invoked module administration interface, which in this example is the deactivate module interface 125.

To do so, in step 231 the management process 120-2 determines if the module 123 to be deactivated is currently active for operation with the module server 123, and if so deactivates the module 123 from operation with the module server 122. Note that if the module 123 for which deactivation is requested is not currently activated, the deactivate module call 144 to the deactivate module interface 125 can return an indication 146 that the requested module 123 to be deactivated is not currently active, or is not installed for operation with the module server 122.

Figure 7:
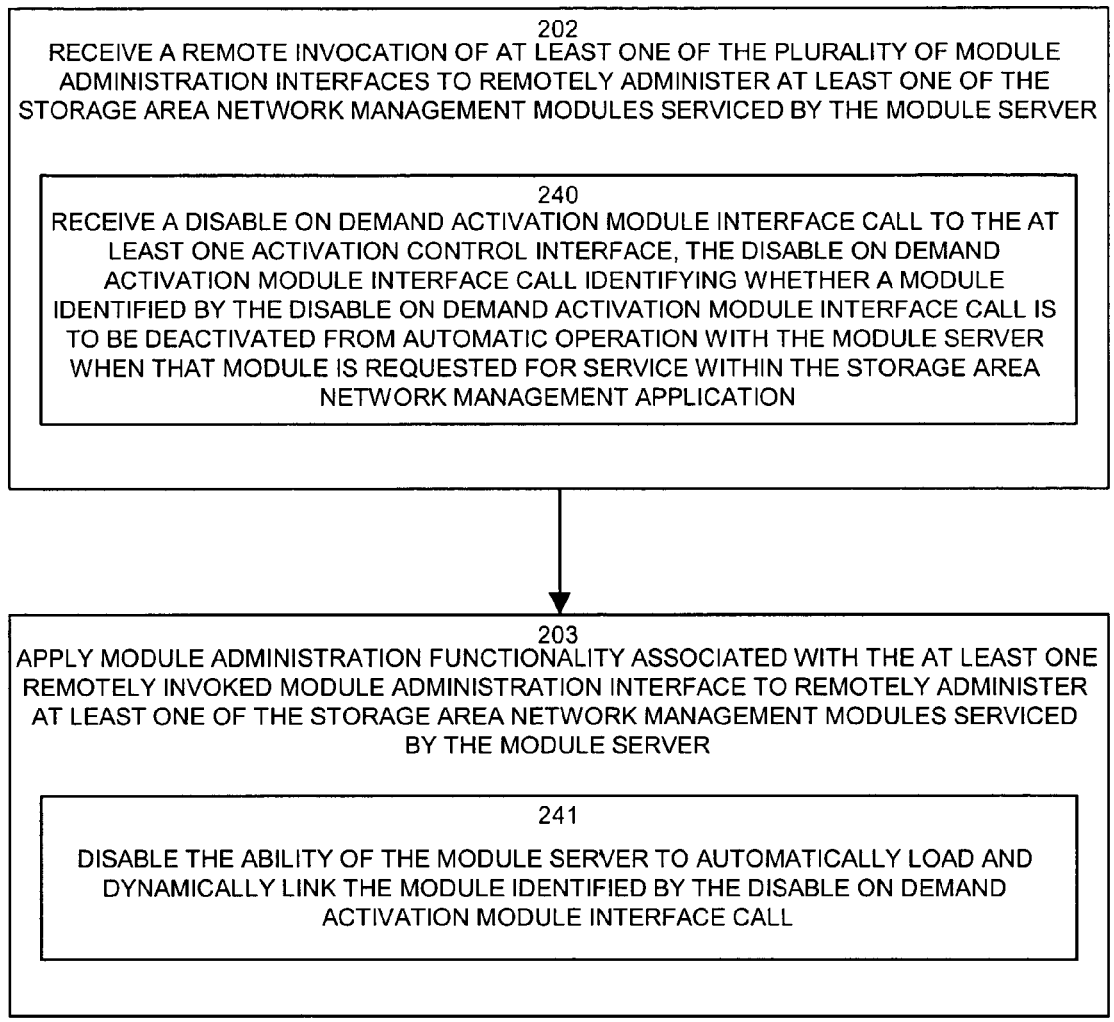
FIG. 7 illustrates processing steps performed by a storage area network management application to process a disable on demand activation interface call in accordance with example embodiment of the invention.

FIG. 7 is a flow chart of processing steps that the management process 120-2 performs according to one embodiment of the invention to operate a disable on-demand activation module interface in order to alter or adjust the "disabled on-demand" attribute associated with a particular module 123 installed within the storage area network management application 120. On-demand activation means that the module server 122 can dynamically load and link a particular module 123 during system execution upon an incoming request or demand for access to the service interface 135 to that particular module 123. If on-demand activation is set to true in the call 144, then any operation or call to service interface 135 provided by that module 123 will cause the module server 122 to automatically load, link and activate the module 123 to handle the incoming call to the module service interface 135. The purpose of on-demand activation according to embodiments of the invention is to conserve resources such that modules 123 can remain inactive until they are needed by client software applications that require the management functionality provided by the modules 123 to perform that modules respective storage area network element management functionality.

In step 202 the management process 120-2 receives a remote invocation 144 of at least one of the plurality of module administration interfaces 125 that in this case is a disable on demand activation module interface 125.

Specifically, in step 240 the management process 120-2 receives a disable on demand activation module interface call 144 to the at least one activation control interface 125. The disable on demand activation module interface call 144 identifies whether a module 123 identified by the disable on demand activation module interface call 144 is to be activated or deactivated from automatic operation with the module server 122 when that module 123 is requested for service (via that module's service interface 135) within the storage area network management application 120. Using the disable on demand activation module interface call 144, the administration module 124 can alter an "on-demand activation" attribute associated with the particular module 123 identified within the call 144 in order to adjust its on demand activation property as to whether or not that module should automatically be operated or started-up for service of client requests upon receipt of client requests 135.

In step 203, the management process 120-2 applies module administration functionality 130 associated with the remotely invoked module administration interface.

Specifically, in step 241 in this embodiment of the invention, the management process 120-2 disables the ability of the module server 122 to automatically load and dynamically link the module 123 identified by the disable on demand activation module interface call 144. Note that if the disable on demand activation interface receives a module identification of a module 123 is not currently installed for operation with the module server 122, the on demand activation call returns a "module not found" message 146. In this manner, the administration module 124 provides the disable on demand activation interface 125 and corresponding module administration functionality 130 in order to allow a remote administrator 180 to configure proper operation of the particular module 123 to cause that module 123 to be automatically started (or not) based upon a client call to that module's service interface 135.

Figure 8B:
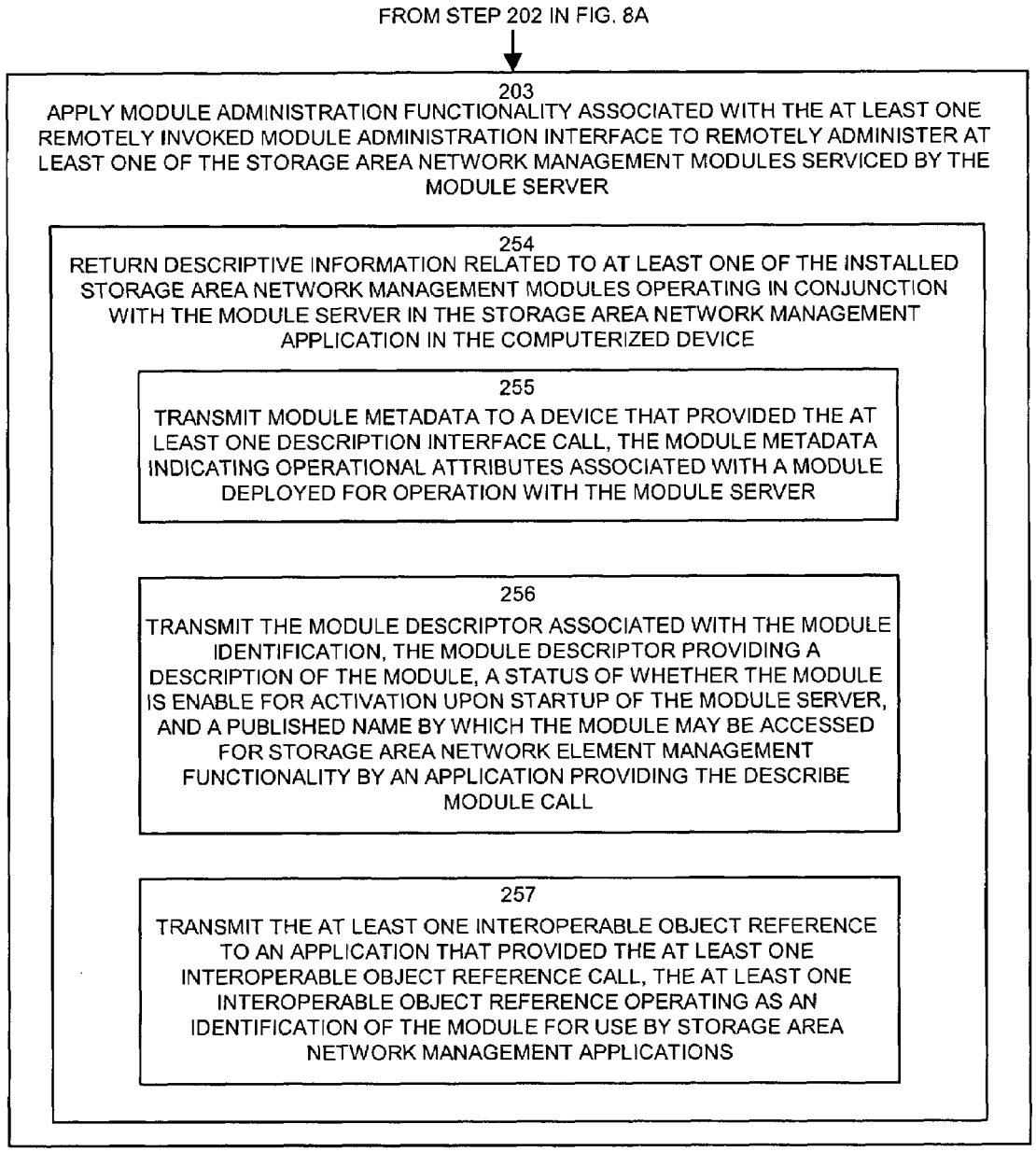
FIG. 8 illustrates processing steps performed by a storage area network management application to process a description interface call in accordance with example embodiment of the invention.

FIGS. 8A and 8B are a single flow chart of processing steps that the administration module 124 operating within the management process 120-2 performs to provide processing associated with a description interface call 144 placed to a description interface 125 that allows a calling entity such as the console 142 to collect information associated with an installed module 123, as well as information associated with the module server 122 and/or the administration module 124.

In particular, beginning in FIG. 8A in step 202, the management process 120-2 receives a remote invocation of one of the module administration interfaces 125, which in this example is a description interface 125.

Specifically, in step 250, the management process 120-2 receives at least one description interface call 144 to the at least one description interface 125. The description interface call 144 requests remote access to descriptive information related to at least one of the installed storage area network management modules 123 operating in conjunction with the module server 122 in the storage area network management application 120 in the computerized device 110. The description interfaces 125 that the administration module 124 provides allow calling entities (i.e., the console 142) to collect information regarding the state of currently installed modules 123-1 through 123-M.

In one embodiment as shown in step 251, the description interface call 144 is a "module metadata list" call 144 requesting access to module metadata for at least one or more installed modules 123 that operate in conjunction with the module server 122.

Alternatively, in another embodiment as shown in step 252, the description interface call is a "describe module" call 144 requesting return of a module descriptor associated with a module 123 that is installed to operate with the module server 122 and that is identified by a module identification specified in the describe module call 144.

In another alternative, in another embodiment as shown in step 253, the description interface call is an "interoperable object reference" call 144 requesting access to at least one interoperable object reference (IOR) associated with at least one module 123 that is installed for operation with the module server 122 and that is identified by a module identification specified in the interoperable object reference call 144.

Accordingly, these three example embodiments of the invention (shown in steps 251, 252 and 253) provide three descriptive interface calls 125 that each can invoke respective module administration functionality 130 within the administration module 124 as explained below to return the requested descriptive information concerning modules 123 installed for operation with the module server 122. After step 202 is complete, processing proceeds to step 203 at the top of FIG. 8B.

In FIG. 8B in step 203, the management process 120-2 applies module administration functionality 130 associated with the remotely invoked module administration interface 125.

For the flow chart of processing steps shown in FIG. 8A, the module administration functionality 130 associated with processing a description interface call 144 corresponds to one of the description interfaces 125 explained above with respect to step 251, 252 or 253 from FIG. 8A. Specifically, if the description interface call is a module metadata list call as explained in step 251 above, then the management process operates according to step 255 explained below. If the description interface call is a describe module call 144 as explained in step 252, then the management process operates according to step 256 explained below. Alternatively, if the description interface call is an interoperable object reference call as explained in step 253, then the management process operates according to step 257 explained below.

Generally, in step 254, the management process 120-2 returns descriptive information related to at least one of the installed storage area network management modules 123 operating in conjunction with the module server 122 in the storage area network management application 120 in the computerized device 110.

Specifically, in step 255, in response to a module metadata list call 144 received in step 251, the management process 120-2 operates the administration module 124 to transmit 146 module metadata to a device 140 (i.e., to the console 142) that provided the description interface call 144. The module metadata indicates current settings of operational attributes associated with one or more modules 123-1 through 123-M deployed for operation with the module server 122. In this manner, the administration module 124 is able to return operational attributes of the various modules 123 installed for operation the module server in response to a module metadata list call. The module metadata list call can accept the identity of specific modules 123, or if no identity is supplied, all module metadata for all modules 123 is returned 146.

Alternatively, in step 256, in response to a describe module call 144 received in step 252, the management process 120-2 transmits a module descriptor associated with the module identification received in the call 144. The module descriptor provides one or more portions of descriptor information, including for example a description of the module, a status of whether the module is enabled for activation upon startup of the module server, and a published name by which the module may be accessed for storage area network element management functionality by an application (e.g., console 142) providing the describe module call.

The describe module call can accept the identity of specific modules 123, or if specific module identity is supplied, all module descriptor information for all modules 123 is returned 146.

Alternatively, in step 257, in response to an "interoperable object reference" call 144 that the administration module 124 receives from an application (e.g., console 142), the administration module 124 operates module functionality 130 to return an interoperable object reference 146 to the entity that provided the interoperable object reference call. The interoperable object reference operates as an identification of the module 123 for use by the storage area network management application console 142. The interoperable object reference call can specify the identity of specific modules 123, or if no specific module identity is supplied, all interoperable object reference information for all modules 123 is returned 146.

From the foregoing processing steps described above in a flow chart in FIGS. 8A and 8B, one embodiment of the invention provides one or more description interface calls to description interfaces 125 that the administration module 124 exposes for administration of the various modules 123.

Figure 9:
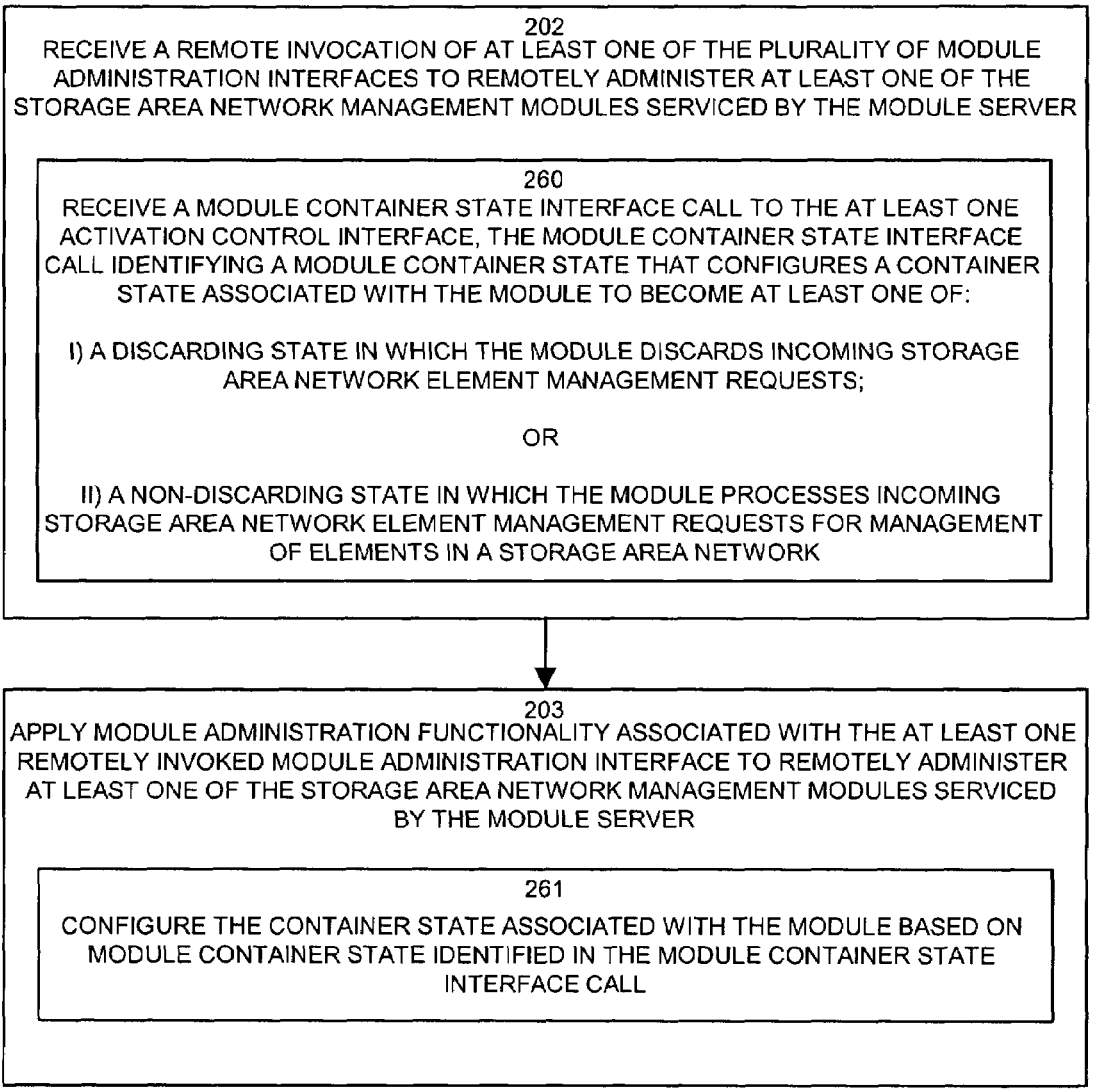
FIG. 9 illustrates processing steps performed by a storage area network management application to process a module container state interface call in accordance with example embodiment of the invention.

FIG. 9 is a flow chart of processing steps that the management process 120-2 performs to implement a "module container state" interface call 144 to an activation control interface 125 provided by the administration module 124. As noted above, the activation control interfaces 125 allow operational control of installed modules 123 that interoperate with the module server 122. The "module container state" interface call 144 is another embodiment of an activation control interface 125.

In step 202, the management process 120-2 receives a remote invocation 144 of at least one of the module administration interfaces 125, which in this example is a module container state interface 125.

Specifically, in step 260 the management process 120-2 receives a "module container state" interface call 125 to an activation control interface 125. The module container state interface call 125 identifies a module container state that the administration module 124 uses to configure a container state associated with the module 123 identified in the call. The container state of a module 123 contains operational information or data identifying how the particular module 123 should operate (or how the module server 122 should operate) upon receiving incoming storage area network element management requests from client applications that desire to use the functionality of the particular module 123. In particular, in one embodiment of the invention, the module container state interface call 125 can convey container state information that indicates that the administration module 124 is to set the container state of the identified module 123 to a "discarding" state in which the module 123 (or the module server 122) is to discard incoming storage area network element management requests. This container state can be useful, for example, in situations in which a particular installed module 123 is installed with on-demand activation enabled such that any incoming requests for access to functionality of that module cause the module server 122 to immediately activate the module 123 in order to process the incoming client requests. If on-demand activation is active and an administrator 180 wants to manage a particular module 123, the administrator may need to be certain that the module 123 will remain un-activatable in the event that a client application (other than the application performing the administration task) requests the service provided by the module 123. Accordingly, since embodiments of the invention provide the module container state interface 125, the administration module 124 can turn off the ability of the module server 122 to automatically invoke the module 123 in the event the client application asks for its service (via service interface 135 to that module 123) during the same time that the administrator 180 desires to perform administration 131 (via calls 125) to the module 123.

As an example, suppose the module administration to be performed is to replace a module 123 with an upgrade or enhanced version. If frequent requests 135 are made for the service of a particular module 123 from clients requiring the module's functions, an administrator 180 may be uncertain if he or she will have enough time to replace the module 123 with an upgraded version during time between service interface calls 135 to that module 123. Since embodiments of the invention do not require the administrator to stop the functionality of the module server 122 to perform such a module replacement, the module server 122 remains active and operational during the module replacement process. However, since the module server 122 is active, it may happen to receive a client request for the service provided by the module 123 being replaced (i.e., the module 123 to be replaced may be constantly activated via requests to the service interface 135). This can create a race condition in which the administrator 180 might otherwise (if not for this embodiment of the invention) be forced to quickly perform the module replacement between incoming requests 135 for the services of the module being replaced. However, since embodiments of the invention provide the module container state interface call 144 to the module container state interface 125, the administrator 180 can instruct the administration module 124 to first set the container state of the module 123 to discard incoming requests for service. Accordingly, during this "discard" container state setting, the module server 122 (that is active during the entire module replacement process), will reject requests for the module service. In a sense, this allows the administrator 180 to take on-demand activated modules "offline" for a time period until the administration task (module replacement in this example) can be completed.

In an alternative, the module container state interface call can set the container state of a module 123 to a non-discarding state in which the module 123 again processes incoming storage area network element management requests 135 for management of elements 150 in a storage area network. The administrator 180 can provide this call after the administration task on the module 123 is complete and the administrator desires that the module is able to again process incoming service requests on service interface 135.

In step 203 in FIG. 9, the management process applies module administration functionality 130 associated with the remotely invoked module administration interface, which in this example is the module container state interface 125.

Specifically, in step 261 the management process 120-2 configures the container state associated with the module 123 based on module container state information identified in the module container state interface call 144 as explained above.

Figure 10:
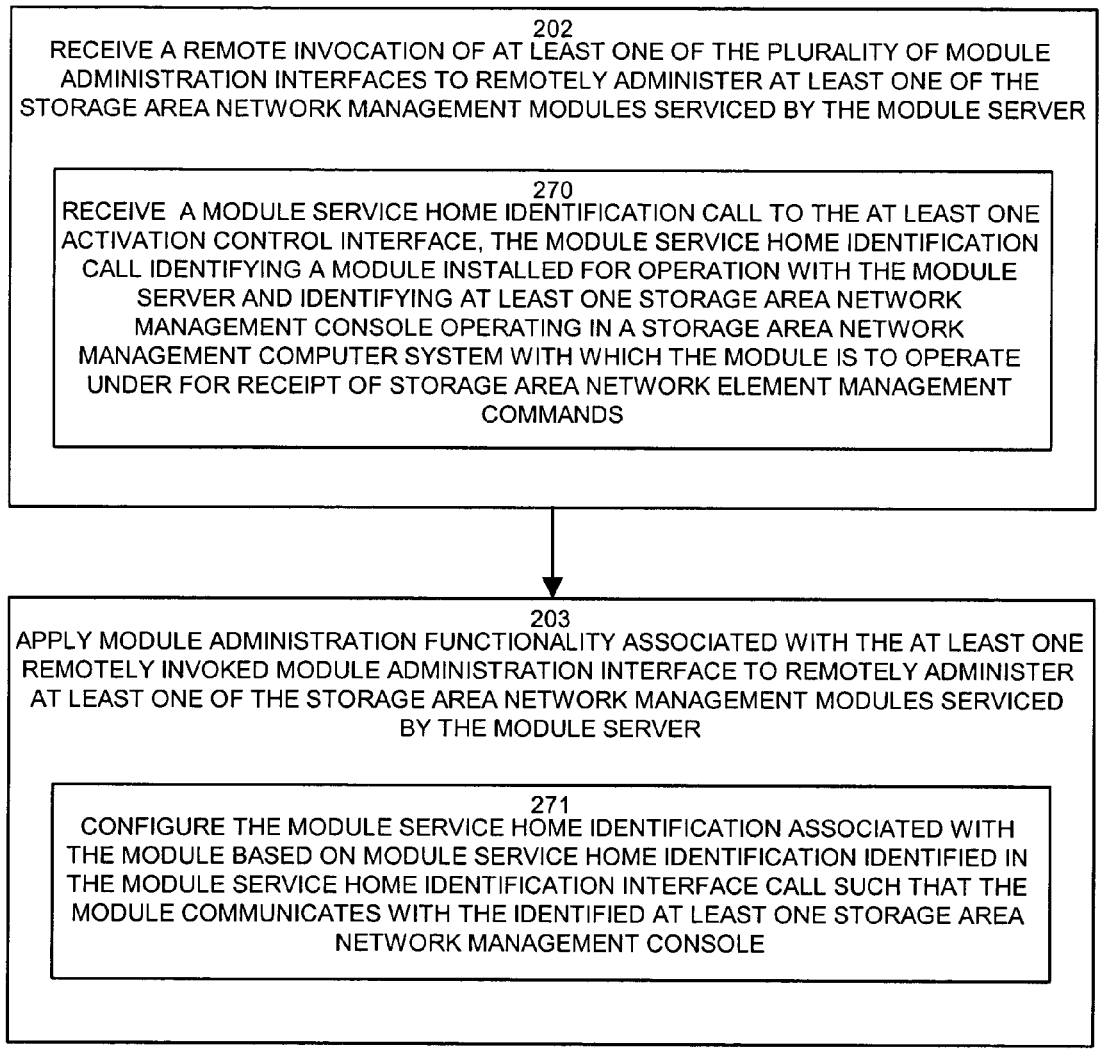
FIG. 10 illustrates processing steps performed by a storage area network management application to process a module service home identification interface call in accordance with example embodiment of the invention.

FIG. 10 is a flow chart of processing steps that the management process 120-2 performs to provide processing associated with establishing or setting a particular console 142 as the home or controlling console for that module 123. That is, if there are multiple consoles 142 on various management workstations 140, the processing in FIG. 10 is provided by embodiments of the invention to allow an administrator to set a particular console 142 as the controlling console for that module 123.

In step 202, the management process 120-2 receives a remote invocation of at least one of the plurality of module administration interfaces, which in this embodiment is the module service home identification interface.

Specifically, in step 270 the management process 120-2 receives a module service home identification call 144 to the at least one activation control interface 125. The module service home identification call 144 to a module service home identification interface 125 identifies a module 123 installed for operation with the module server 122 and identifies at least one storage area network management console 142 operating in a storage area network management computer system 140 with which the module 123 is to operate under for receipt of storage area network element management commands.

In step 203, the management process 120-2 applies module administration functionality 130 associated with the remotely invoked module administration interface 125.

In step 271, the management process 120-2 configures the module service home identification associated with the module 123 based on a module service home identification identified in the module service home identification interface call 144 such that the module 123 communicates with the properly identified storage area network management console 142.

In this manner, embodiments of the invention provide an administration module 124 that provides numerous module administration interfaces for use in administering and managing modules 123 that operate with a module server 122. Those skilled in the art will understand that there can be many other variations made to the operations of the embodiments explained above while still achieving the same objectives of the invention. As an example, variations in the order of processing steps in the aforementioned flow charts will now be appreciated to those skilled in the art as having the same effect if processed in a different order. As another example, particular configurations of the network management application may include only certain embodiments of the invention and need not include all functionality explained herein. Such variations are intended to be covered by the scope of this invention. As such, the foregoing description of embodiments of the invention is not intended to be limiting.

What is claimed is:

1. In a computerized device, a method for administering software storage area network management modules that operate as part of a storage area network management software application, the method comprising the steps of:
    operating a module server to service a plurality of different storage area network management modules that each provide a respective type of management functionality for elements operating within a storage area network associated with the computerized device, the module server lacking administration capability of the plurality of different storage area network management modules;
    operating an administration module in conjunction with the module server, the administration module providing a plurality of module administration interfaces that can be remotely invoked to administer the plurality of different storage area network management modules, the plurality of module administration interfaces including at least one description interface allowing remote access to descriptive information related to one or more storage area network management modules operating in conjunction with the module server in the storage area network management application in the computerized device;
    receiving a remote invocation of at least one of the plurality of module administration interfaces to remotely administer at least one of the storage area network management modules serviced by the module server; and
    applying module administration functionality associated with the at least one remotely invoked module administration interface to remotely administer at least one of the storage area network management modules serviced by the module server.

2. The method of claim 1 wherein the plurality of module administration interfaces further include:
    i) at least one installation interface having associated module administration installation functionality allowing remote installation and removal of storage area network management modules operating in the storage area network management application in the computerized device; and
    ii) at least one activation control interface having associated module administration activation control functionality allowing remote control of operation of installed storage area network management modules operating in the storage area network management application in the computerized device.

3. The method of claim 2 wherein receiving a remote invocation of at least one of the plurality of module administration interfaces comprises:
    receiving a deploy module interface call identifying:
        i) module metadata indicating operational attributes associated with a module to be installed and deployed for operation with the module server;
        ii) a module file list identifying module files to be installed for operation of the module to perform storage area network element management tasks associated with that module; and
    wherein applying module administration functionality associated with the at least one remotely invoked module administration interface comprises:
        executing the module administration deployment functionality associated with the deploy module interface call to install the module files identified in the module file list for runtime access by the storage area network management application for operation with the module server; and
        configuring operational attributes indicated in the module metadata to allow the module server to properly operate in conjunction with the installed storage area network management module files to allow operation of the module to manage elements in the storage area network.

4. The method of claim 3 wherein the operational attributes indicated by the metadata include an activate on demand attribute that is set to indicate whether that storage area network management module is to be activated for operation with the module server on demand when a request for that module is received by the storage area network management application.

5. The method of claim 2 wherein receiving a remote invocation of at least one of the plurality of module administration interfaces comprises:
    receiving a remove module interface call to the at least one module installation interface, the remove module interface call identifying at least one module to be removed from installation and operation with the module server within the storage area network management application; and wherein applying module administration functionality associated with the at least one remotely invoked module administration interface comprises:
determining if the module to be removed is currently installed for operation with the module server, and if so:
i) removing the module from installation with the module server; and
ii) deleting files listed in a module file list, received when the module was installed, the module file list identifying module files to that were installed for operation of the module to perform storage area network element management tasks associated with that module.

6. The method of claim 2 wherein receiving a remote invocation of at least one of the plurality of module administration interfaces comprises:
receiving a deactivate module interface call to the at least one activation control interface, the deactivate module interface call identifying at least one module to be deactivated from operation with the module server within the storage area network management application; and
wherein applying module administration functionality associated with the at least one remotely invoked module administration interface comprises:
determining if the module to be deactivated is currently active for operation with the module server, and if so deactivating the module from operation with the module server.

7. The method of claim 2 wherein receiving a remote invocation of at least one of the plurality of module administration interfaces comprises:
receiving a disable on demand activation module interface call to the at least one activation control interface, the disable on demand activation module interface call identifying whether a module identified by the disable on demand activation module interface call is to be deactivated from automatic operation with the module server when that module is requested for service within the storage area network management application; and
wherein applying module administration functionality associated with the at least one remotely invoked module administration interface comprises:
disabling the ability of the module server to automatically load and dynamically link the module identified by the disable on demand activation module interface call.

8. The method of claim 2 wherein receiving a remote invocation of at least one of the plurality of module administration interfaces comprises:
receiving at least one description interface call to the at least one description interface, the at least one description interface call requesting remote access to descriptive information related to at least one of the installed storage area network management modules operating in conjunction with the module server in the storage area network management application in the computerized device; and
wherein applying module administration functionality associated with the at least one remotely invoked module administration interface comprises:
returning descriptive information related to at least one of the installed storage area network management modules operating in conjunction with the module server in the storage area network management application in the computerized device.

9. The method of claim 8 wherein the at least one description interface call is a module metadata list call requesting access to module metadata for at least one installed module that operates in conjunction with the module server; and
wherein returning descriptive information comprises:
transmitting module metadata to a device that provided the at least one description interface call, the module metadata indicating operational attributes associated with a module deployed for operation with the module server.

10. The method of claim 8 wherein the at least one description interface call is a describe module call requesting a module descriptor associated with a module that is installed to operate with the module server and that is identified by a module identification specified in the describe module call; and
wherein returning descriptive information comprises:
transmitting the module descriptor associated with the module identification, the module descriptor providing a description of the module, a status of whether the module is enable for activation upon startup of the module server, and a published name by which the module may be accessed for storage area network element management functionality by an application providing the describe module call.

11. The method of claim 8 wherein the at least one description interface call is a interoperable object reference call requesting access to at least one interoperable object reference associated with at least one module that is installed to operate with the module server and that is identified by a module identification specified in the interoperable object reference call; and
wherein returning descriptive information comprises:
transmitting the at least one interoperable object reference to an application that provided the at least one interoperable object reference call, the at least one interoperable object reference operating as an identification of the module for use by storage area network management applications.

12. The method of claim 2 wherein receiving a remote invocation of at least one of the plurality of module administration interfaces comprises:
receiving a module container state interface call to the at least one activation control interface, the module container state interface call identifying a module container state that configures a container state associated with the module to become at least one of:
i) a discarding state in which the module discards incoming storage area network element management requests;
ii) a non-discarding state in which the module processes incoming storage area network element management requests for management of elements in a storage area network; and
wherein applying module administration functionality associated with the at least one remotely invoked module administration interface comprises:
configuring the container state associated with the module based on module container state identified in the module container state interface call.

13. The method of claim 2 wherein receiving a remote invocation of at least one of the plurality of module administration interfaces comprises:

receiving a module service home identification call to the at least one activation control interface, the module service home identification call identifying a module installed for operation with the module server and identifying at least one storage area network management console operating in a storage area network management computer system with which the module is to operate under for receipt of storage area network element management commands; and wherein applying module administration functionality associated with the at least one remotely invoked module administration interface comprises:

configuring the module service home identification associated with the module based on module service home identification identified in the module service home identification interface call such that the module communicates with the identified at least one storage area network management console.

14. A computerized device comprising:

a communications interface;

a memory;

a processor;

an interconnection mechanism coupling the communications interface, a memory and a processor;

wherein the memory is encoded with a storage area network management application code including an administration module that when executed by the processor, produces a storage area network management process that administers storage area network management modules by performing the operations of:

operating a module server to service a plurality of different storage area network management modules that each provide a respective type of management functionality for elements operating within a storage area network associated with the computerized device, the module server lacking administration capability of the plurality of different storage area network management modules;

operating the administration module in conjunction with the module server, the administration module providing a plurality of module administration interfaces that are software interfaces that can be remotely invoked to administer the plurality of different storage area network management modules, the plurality of module administration interfaces including at least one description interface allowing remote access to descriptive information related to one or more storage area network management modules operating in conjunction with the module server in the storage area network management application in the computerized device;

receiving a remote invocation, over the communications interface, of at least one of the plurality of module administration interfaces to remotely administer at least one of the storage area network management modules serviced by the module server; and applying module administration functionality associated with the at least one remotely invoked module administration interface to remotely administer at least one of the storage area network management modules serviced by the module server.

15. The computerized device of claim 14 wherein the plurality of module administration interfaces further include:

i) at least one installation interface having associated module administration installation functionality allowing remote installation and removal of storage area network management modules operating in the storage area network management application in the computerized device; and ii) at least one activation control interface having associated module administration activation control functionality allowing remote control of operation of installed storage area network management modules operating in the storage area network management application in the computerized device.

16. The computerized device of claim 15 wherein when the storage area network management application performs the operation of receiving a remote invocation of at least one of the plurality of module administration interfaces, the storage area network management application performs the operations of:

receiving a deploy module interface call identifying:

i) module metadata indicating operational attributes associated with a module to be installed and deployed for operation with the module server;

ii) a module file list identifying module files to be installed for operation of the module to perform storage area network element management tasks associated with that module; and wherein when the storage area network management application performs the operation of applying module administration functionality associated with the at least one remotely invoked module administration interface, the storage area network management application performs the operations of:

executing the module administration deployment functionality associated with the deploy module interface call to install the module files identified in the module file list for runtime access by the storage area network management application for operation with the module server; and configuring operational attributes indicated in the module metadata to allow the module server to properly operate in conjunction with the installed storage area network management module files to allow operation of the module to manage elements in the storage area network.

17. The computerized device of claim 15 wherein the operational attributes indicated by the metadata include an activate on demand attribute that is set to indicate whether that storage area network management module is to be activated for operation with the module server on demand when a request for that module is received by the storage area network management application.

18. The computerized device of claim 15 wherein when the storage area network management application performs the operation of receiving a remote invocation of at least one of the plurality of module administration interfaces, the storage area network management application performs the operation of:

receiving a remove module interface call to the at least one module installation interface, the remove module interface call identifying at least one module to be removed from installation and operation with the module server within the storage area network management application; and wherein when the storage area network management application performs the operation of applying module administration functionality associated with the at least one remotely invoked module administration interface, the storage area network management application performs the operations of:

determining if the module to be removed is currently installed for operation with the module server, and if so:
  i) removing the module from installation with the module server; and
  ii) deleting files listed in a module file list, received when the component was installed, the module file list identifying module files to that were installed for operation of the module to perform storage area network element management tasks associated with that module.

19. The computerized device of claim 15 wherein when the storage area network management application performs the operation of receiving a remote invocation of at least one of the plurality of module administration interfaces, the storage area network management application performs the operation of:
  receiving a deactivate module interface call to the at least one activation control interface, the deactivate module interface call identifying at least one module to be deactivated from operation with the module server within the storage area network management application; and
  wherein when the storage area network management application performs the operation of applying module administration functionality associated with the at least one remotely invoked module administration interface, wherein when the storage area network management application performs the operation of:
    determining if the module to be deactivated is currently active for operation with the module server, and if so deactivating the module from operation with the module server.

20. The computerized device of claim 15 wherein when the storage area network management application performs the operation of receiving a remote invocation of at least one of the plurality of module administration interfaces, the storage area network management application performs the operation of:
  receiving a disable on demand activation module interface call to the at least one activation control interface, the disable on demand activation module interface call identifying whether a module identified by the disable on demand activation module interface call is to be deactivated from automatic operation with the module server when that module is requested for service within the storage area network management application; and
  wherein when the storage area network management application performs the operation of applying module administration functionality associated with the at least one remotely invoked module administration interface, the storage area network management application performs the operation of:
    disabling the ability of the module server to automatically load and dynamically link the module identified by the disable on demand activation module interface call.

21. The computerized device of claim 15 wherein when the storage area network management application performs the operation of receiving a remote invocation of at least one of the plurality of module administration interfaces, the storage area network management application performs the operation of:
  receiving at least one description interface call to the at least one description Interface, the at least one description interface call requesting remote access to descriptive information related to at least one of the installed storage area network management modules operating in conjunction with the module server in the storage area network management application in the computerized device; and
  wherein when the storage area network management application performs the operation of applying module administration functionality associated with the at least one remotely invoked module administration interface, the storage area network management application performs the operation of:
    returning descriptive information related to at least one of the installed storage area network management modules operating in conjunction with the module server in the storage area network management application in the computerized device.

22. The computerized device of claim 21 wherein the at least one description interface call is a module metadata list call requesting access to module metadata for at least one installed module that operates in conjunction with the module server; and
  wherein when the storage area network management application performs the operation of returning descriptive information, the storage area network management application performs the operation of:
    transmitting module metadata, over the communications interface, to a device that provided the at least one description interface call, the module metadata indicating operational attributes associated with a module deployed for operation with the module server.

23. The computerized device of claim 21 wherein the at least one description interface call is a describe module call requesting a module descriptor associated with a module that is installed to operate with the module server and that is identified by a module identification specified in the describe module call; and
  wherein when the storage area network management application performs the operation of returning descriptive information, the storage area network management application performs the operation of:
    transmitting the module descriptor associated with the module identification, the module descriptor providing a description of the module, a status of whether the module is enable for activation upon startup of the module server, and a published name by which the module may be accessed for storage area network element management functionality by an application providing the describe module call.

24. The computerized device of claim 21 wherein the at least one description interface call is a interoperable object reference call requesting access to at least one interoperable object reference associated with at least one module that is installed to operate with the module server and that is identified by a module identification specified in the interoperable object reference call; and
  wherein when the storage area network management application performs the operation of returning descriptive information, the storage area network management application performs the operation of:
    transmitting the at least one interoperable object reference to an application that provided the at least one interoperable object reference call, the at least one interoperable object reference operating as an identification of the module for use by storage area network management applications.

25. The computerized device of claim 15 wherein when the storage area network management application performs the operation of receiving a remote invocation of at least one of the plurality of module administration interfaces, the storage area network management application performs the operation of:
  receiving a module container state interface call to the at least one activation control interface, the module container state interface call identifying a module container state that configures a container state associated with the module to become at least one of:
    i) a discarding state in which the module discards incoming storage area network element management requests;
    ii) a non-discarding state in which the module processes incoming storage area network element management requests for management of elements in a storage area network; and
  wherein when the storage area network management application performs the operation of applying module administration functionality associated with the at least one remotely invoked module administration interface, the storage area network management application performs the operation of:
    configuring the container state associated with the module based on module container state identified in the module container state interface call.

26. The computerized device of claim 15 wherein when the storage area network management application performs the operation of receiving a remote invocation of at least one of the plurality of module administration interfaces, the storage area network management application performs the operation of:
  receiving a module service home identification call to the at least one activation control interface, the module service home identification call identifying a module installed for operation with the module server and identifying at least one storage area network management console operating in a storage area network management computer system with which the module is to operate under for receipt of storage area network element management commands; and
  wherein when the storage area network management application performs the operation of applying module administration functionality associated with the at least one remotely invoked module administration interface, the storage area network management application performs the operation of:
    configuring the module service home identification associated with the module based on module service home identification identified in the module service home identification interface call such that the module communicates with the identified at least one storage area network management console.

27. A computerized device comprising:
  a communications interface;
  a memory;
  a processor;
  an interconnection mechanism coupling the communications interface, a memory and a processor;
  wherein the memory is encoded with a storage area network management application code including an administration module that when executed by the processor, produces a storage area network management process that includes a means for administering storage area network management modules, such means including:
  means for operating a module server to service a plurality of different storage area network management modules that each provide a respective type of management functionality for elements operating within a storage area network associated with the computerized device, the module server lacking administration capability of the plurality of different storage area network management modules;
  means for operating the administration module in conjunction with the module server, the administration module providing a plurality of module administration interfaces that are software interfaces that can be remotely invoked to administer the plurality of different storage area network management modules, the plurality of module administration interfaces including at least one description interface allowing remote access to descriptive information related to one or more storage area network management modules operating in conjunction with the module server in the storage area network management application in the computerized device;
  means for receiving a remote invocation, over the communications interface, of at least one of the plurality of module administration interfaces to remotely administer at least one of the storage area network management modules serviced by the module server; and
  means for applying module administration functionality associated with the at least one remotely invoked module administration interface to remotely administer at least one of the storage area network management modules serviced by the module server.

28. A computer program product having a computer-readable medium including storage area network management application computer program logic code encoded thereon that, when performed in a computerized device, provides a storage area network management process that operates as a storage area network management application to administer storage area network management modules via the operations of:
  operating a module server to service a plurality of different storage area network management modules that each provide a respective type of management functionality for elements operating within a storage area network associated with the computerized device, the module server lacking administration capability of the plurality of different storage area network management modules;
  operating the administration module in conjunction with the module server, the administration module providing a plurality of module administration interfaces that are software interfaces that can be remotely invoked to administer the plurality of different storage area network management modules, the plurality of module administration interfaces including at least one description interface allowing remote access to descriptive information related to one or more storage area network management modules operating in conjunction with the module server in the storage area network management application in the computerized device;
  receiving a remote invocation of at least one of the plurality of module administration interfaces to remotely administer at least one of the storage area network management modules serviced by the module server; and
  applying module administration functionality associated with the at least one remotely invoked module administration interface to remotely administer at least one of the storage area network management modules serviced by the module server.

* * * * *